United States Patent [19]

Cheu et al.

[11] Patent Number: 5,210,688
[45] Date of Patent: May 11, 1993

[54] SINOGRAPHY METHOD AND APPARATUS

[75] Inventors: Yen F. Cheu, Rochester Hills; August F. Scarpelli, Warren, both of Mich.

[73] Assignee: General Motors Corporation, Detroit, Mich.

[21] Appl. No.: 526,263

[22] Filed: May 21, 1990

[51] Int. Cl.$^5$ ............... G06F 15/42; G06F 15/66
[52] U.S. Cl. ................... 364/413.19; 364/413.14; 364/413.2; 364/413.21; 378/19; 378/62; 378/901; 382/42; 382/54
[58] Field of Search ............ 364/413.13, 413.14, 364/413.19, 413.2, 413.21; 378/19, 62, 99, 901; 382/42, 43, 54

[56] References Cited

U.S. PATENT DOCUMENTS

| | | | |
|---|---|---|---|
| 4,205,375 | 5/1980 | Inouye et al. | 364/413.21 |
| 4,554,633 | 11/1985 | Glover et al. | 364/413.15 |
| 4,570,224 | 2/1986 | Shimoni et al. | 364/413.16 |
| 4,577,222 | 3/1986 | Kruger et al. | 358/111 |
| 4,599,742 | 7/1986 | Kikuchi et al. | 378/99 |
| 4,606,004 | 8/1986 | Crawford et al. | 364/413.2 |
| 4,623,923 | 11/1986 | Orbach | 382/54 |
| 4,694,342 | 9/1987 | Klees | 382/54 |
| 4,707,786 | 11/1987 | Dehner | 364/413.21 |
| 4,729,100 | 3/1988 | Tsujii | 364/413.21 |
| 4,783,840 | 11/1988 | Song | 382/54 |
| 4,803,639 | 2/1989 | Steele et al. | 364/507 |
| 4,803,711 | 2/1989 | Tsujii et al. | 378/4 |
| 4,817,179 | 3/1989 | Buck | 382/54 |
| 5,001,429 | 3/1991 | Constable et al. | 364/413.19 |
| 5,050,227 | 9/1991 | Furusawa et al. | 382/54 |
| 5,128,864 | 7/1992 | Waggener et al. | 364/413.21 |

Primary Examiner—Roy N. Envall, Jr.
Assistant Examiner—Jennifer L. Hazard
Attorney, Agent, or Firm—Tim G. Jaeger

[57] ABSTRACT

Tomography apparatus is used to irradiate a body cross section and acquire a relatively small amount of data which is mapped into a two dimensional array or sinogram and image enhancement techniques are applied to the sinogram to reveal visible lines representing flaws. An array processor operates on the sinogram to perform edge enhancement and averaging convolutions, a fast Fourier transform, low pass filtering in frequency domain, and an inverse fast Fourier transform to generate the enhanced sinogram.

3 Claims, 4 Drawing Sheets

FIG. 6
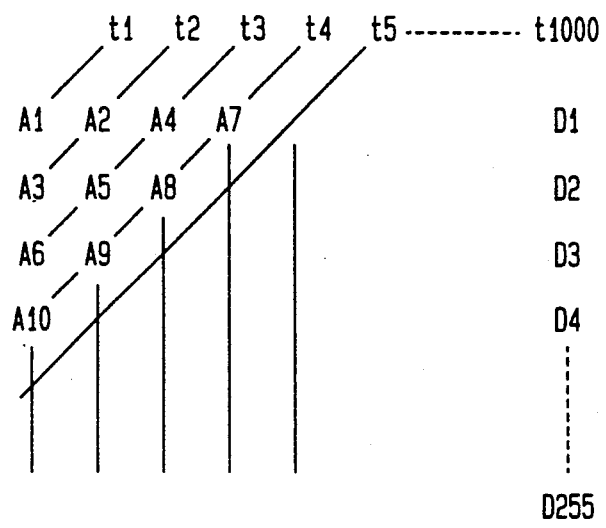
FIG. 7
| 0 | 0 | 0 | 0 | 0 |
|---|---|---|---|---|
| 0 | 0 | 0 | 0 | 0 |
| -2 | 1 | 2 | 1 | -2 |
| 0 | 0 | 0 | 0 | 0 |
| 0 | 0 | 0 | 0 | 0 |
FIG. 8
| 0 | 0 | 0.2 | 0 | 0 |
|---|---|---|---|---|
| 0 | 0 | 0.2 | 0 | 0 |
| 0 | 0 | 0.2 | 0 | 0 |
| 0 | 0 | 0.2 | 0 | 0 |
| 0 | 0 | 0.2 | 0 | 0 |
FIG. 9
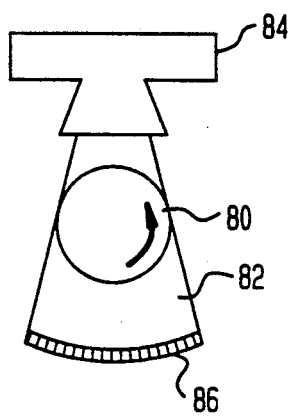

SINOGRAPHY METHOD AND APPARATUS

FIELD OF THE INVENTION

This invention relates to internal inspection of a body by digital radiography and particularly to a method and apparatus of inspecting a cross section of a body to reveal discontinuities by enhanced sinography.

BACKGROUND OF THE INVENTION

Several techniques are available to inspect industrial parts for internal flaws. The nondestructive methods include ultrasonics, eddy current inspection, x-rays, and computed tomography. Ultrasonics requires couplant fluid and its success depends on the surface condition of a test part. The eddy current method detects near surface flaws only. X-rays detect internal flaws without depth information. Computed tomography provides depth information but the process requires a lengthy data acquisition process as well as excessive computational time.

SUMMARY OF THE INVENTION

It is therefore an object of the invention to provide a method and a system to detect internal flaws or other structure with high speed (compared to tomography). It is a further object provide such a method and apparatus to generate a sinogram having high resolution and three dimensional information.

The invention is carried out by a method for generating a processed image corresponding to an internal area of a body, comprising the steps of: relatively moving the body with respect to an irradiation zone formed by a source of radiation and an array of detectors such that a beam of radiation from said source passes through a cross section of the body to the detector array, deriving from the detector array, at different positions of the body in the irradiation zone, a series of data each representing received radiation intensity, mapping the data onto a two dimensional array representing a sinogram of the radiation transmission characteristics of the body at a series of successive positions, enhancing the sinogram by processing the data to reveal discontinuities within the body which are not distinguishable in the unenhanced sinogram, and displaying an image of the processed sinogram.

The invention is further carried out by a system for generating an image corresponding to an internal area of a body to reveal discontinuities in the body comprising: a radiation source, an array of detectors spaced from the source for receiving radiation therefrom and producing an output signal representing the radiation received by the respective detectors, means effecting relative movement between the body and the source and the detector array whereby the output signal is modulated according to the radiation absorption characteristics of the body and the relative body position, computer means for generating a sinogram by acquiring signal data from the detector array at a plurality of different relative positions of the body and mapping the data into a two dimensional array and programmed to generate an enhanced sinogram revealing discontinuities within the body which are not distinguishable in the unprocessed sinogram, and display means coupled to the computer to display the enhanced sinogram.

BRIEF DESCRIPTION OF THE DRAWINGS

The above and other advantages of the invention will become more apparent from the following description taken in conjunction with the accompanying drawings wherein like references refer to like parts and wherein:

FIG. 6 is a diagram illustrating mapping of raw data into a two dimensional array to form a sinogram, FIGS. 7 and 8 are examples of kernels for convolving with the data for edge enhancement and line averaging, respectively, and FIG. 9 is a schematic view of data acquisition apparatus useful in conjunction with another embodiment of the invention.

DESCRIPTION OF THE INVENTION

The ensuing description relates to a system for inspection of industrial parts. It also applies to other objects or bodies susceptible to x-ray examination. Discontinuities within the part or object result in absorption differences which attenuate x-rays passing through the part in different degrees. The discontinuities are called flaws herein, but are any structure discernible by x-ray methods. Thus the inspection may be to find structure which is not a flaw.

Figure 1:
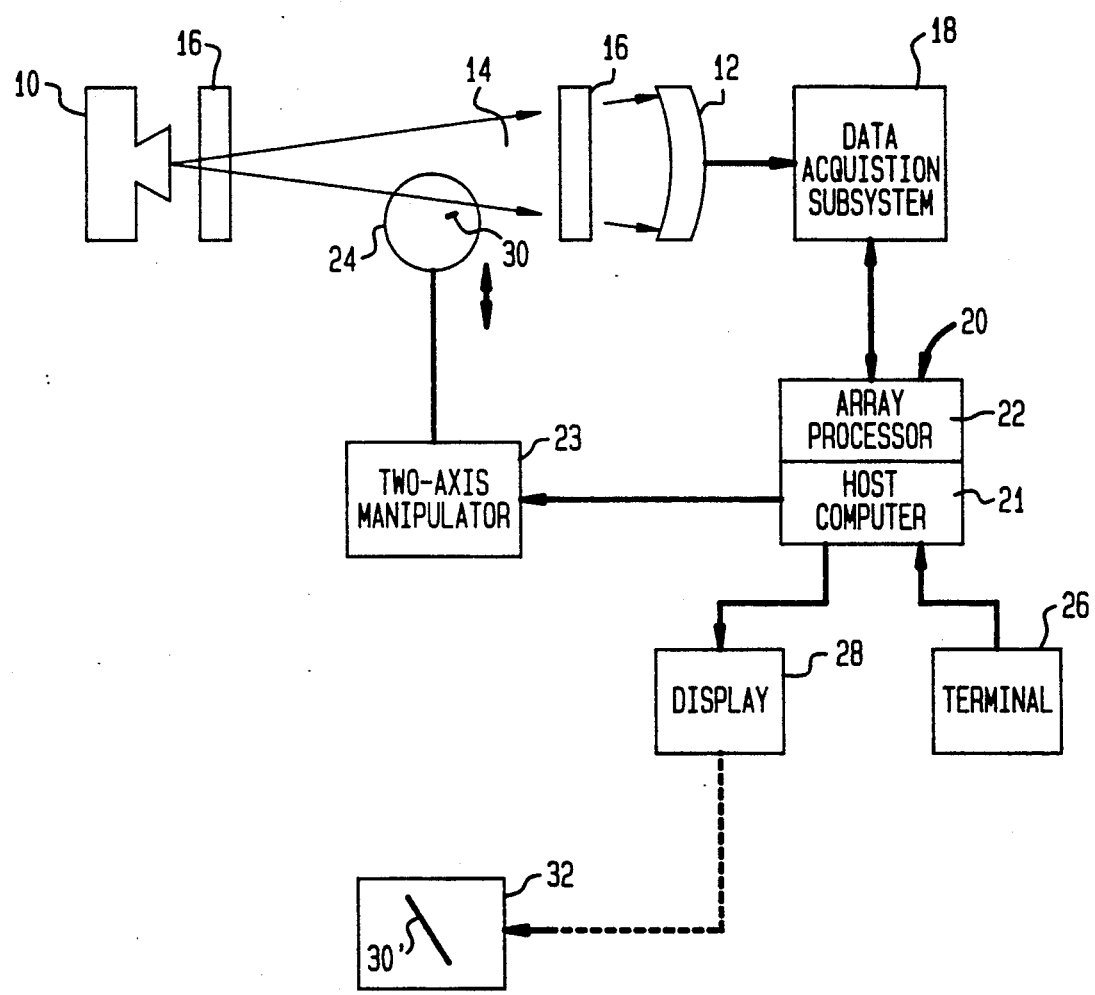
FIG. 1 is a schematic diagram of the apparatus for generating an enhanced sinogram according to the invention.

Referring to FIG. 1, an x-ray tube 10 is spaced from an arcuate array of detectors 12 to define an intervening irradiation zone 14. Collimators 16 at both the tube 10 and the detector array 12 confine the path of radiation to a thin fan-shaped beam. The detectors 12 are coupled to a data acquisition subsystem 18 which, in turn, is coupled to a computer 20 which comprises a host computer 21 and an array processor 22 which processes the data. The host computer 21 is, for example, a Motorola 68000 computer and the array processor 22 is a Mercury 32 bit array processor programmed to perform data mapping, convolutions, fast Fourier transforms, inverse fast Fourier transforms, and filtering. The host computer 21 controls a two-axis manipulator 23 which moves a part 24 or other body to be inspected through the irradiation zone 14. The manipulator is arranged to translate the part through the beam such that a slice of the part is irradiated and then index the part perpendicular to the plane of the slice to repeat the translation and irradiate another slice of the object. A terminal 26 and a display 28 are connected to the host computer 21. The object 24 is shown with a dot 30 which represents a flaw in the cross section under inspection. The flaw is revealed as a line 30' in an enhanced sinogram 32 on the display 28.

The irradiation apparatus 10-16 and the manipulator 23 are commercially available as a second generation tomography system. In the second generation tomography, an object is translated through the x-ray beam to irradiate a given cross section, data is sampled for many translational positions of the object and mapped onto a two dimensional array called a sinogram. Then the object (or the source-detector) is rotated an amount equal to the arc of the detector array, say 20 degrees, and the translation is repeated through the same cross section to obtain another sinogram. The process continues until the object is rotated 180 degrees, say nine times to obtain nine sinograms, and the data is processed by computer to generate a tomogram which is an image of the cross section revealing the size, shape and location of each flaw or other structure in the sampled slice of the object.

Figure 2:
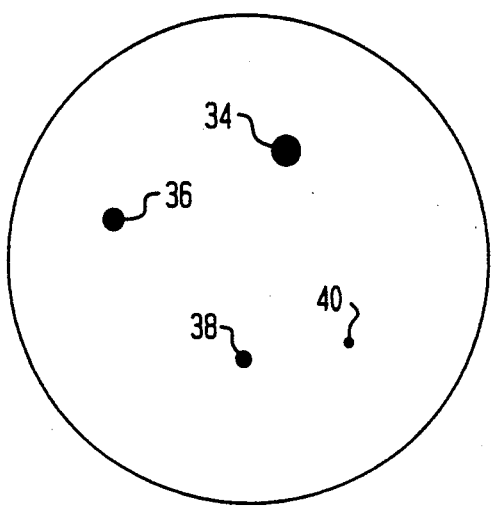
FIG. 2 is an image of a tomogram of a cylindrical part revealing flaws in the part.
Figure 3:
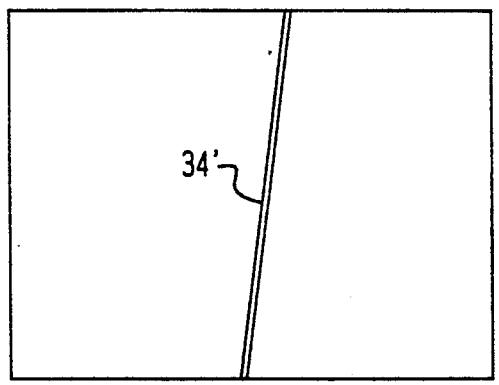
FIG. 3 is an image of a sinogram of the same part as used in FIG. 2.
Figure 4:
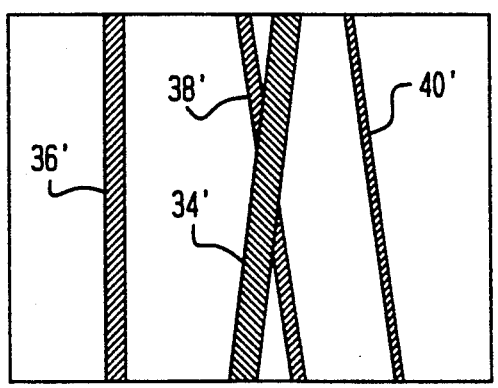
FIG. 4 is an image of an enhanced sinogram processed according to the method of the invention.

Images of the individual sinograms, if viewed on the display 28, show only large and distinct flaws in the cross section. For example, an image of a tomogram of a part as shown in FIG. 2 reveals a large flaw 34 and smaller flaws 36, 38 and 40. However, an image of a typical sinogram produced according to conventional tomography practice, as shown in FIG. 3, may show a faint line 34' corresponding to the flaw 34 and show nothing of the other flaws. By enhancing the sinogram image, however, the line 34' is intensified and the other flaws all become visible as lines 36', 38' and 40', shown in an image of the enhanced sinogram in FIG. 4. Thus by suitable processing, information hidden in the sinogram can be made visible and useful for inspection purposes. This information is made available in a small fraction of the time required for a tomogram due to making only one sinogram per cross section, using less data and using a simpler algorithm to process the data. It should be understood that the drawings of FIGS. 2-4 show very distinct spots or lines whereas the actual displays are patterns of gray on gray which are less distinct yet visible to the viewer.

Figure 5:
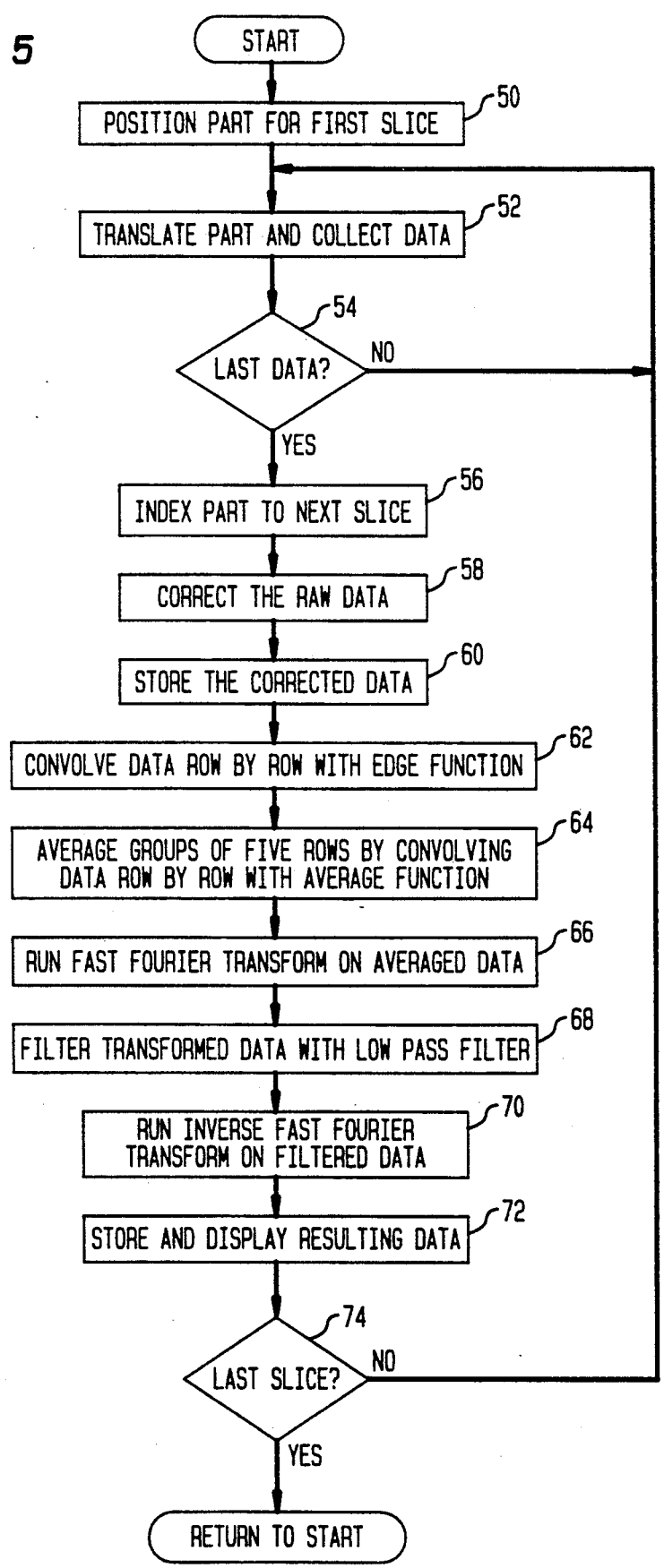
FIG. 5 is a flow chart illustrating the method of the invention.

The flow chart of FIG. 5 summarizes the method of acquiring and processing the data to generate an enhanced sinogram. In the description of the flow chart, the functional explanation marked with numerals in angle brackets, <nn>, refers to blocks bearing that number. Initially, the part is positioned for the first slice <50> and is translated under control of the host computer 21 through the irradiation field and data is collected from the detectors <52>. The data is collected for many positions of the part in the zone and when the last data is received for a given slice <54> the part is indexed to the next slice position <56>.

The data for a single sinogram is acquired in the same way as for a tomogram. An array of 255 detectors D1-D255 sends radiation intensity signals to the data acquisition subsystem 18 which amplifies and digitizes the data. The array processor maps the data onto a two dimensional array. Only detectors sensing radiation passing through the part are read. Thus when the part 24 is only partially in the radiation zone only part of the detectors are sampled. Referring to FIG. 6 which shows data mapped into rows D1, D2, etc. and into columns, when the part initally reaches the edge of the zone 14 at time t1, detector D1 is the only detector to render a reading and the reading A1 is mapped into the first column in the D1 row. When the next detector D2 senses the part at time t2, both detectors D1 and D2 are read and the D1 data A2 is entered in the second column and the D2 data A3 is entered in the first column. Similarly, at time t3 the next data A4, A5, and A6 are entered into the third, second and first columns respectively. The two dimensional array is built up in that manner. The detectors are sampled about 1000 times as the part passes across the irradiation zone. At the end of the translation only the detector D255 yields data and this is the signal that the scan is completed <54>.

Suppose a flaw in the part caused a reading different from background readings in data points A2, A5, A9 and others in the same column: one might expect a line to be visible in the column. However, due to noise and possibly a small difference in radiation intensity, such lines are generally not apparent, even though they may be several columns wide. The data must be enhanced to intensify any lines which may be there. After the data has been acquired, it is first corrected for detector drift by subtracting a previously measured offset <58> and stored <60>. The stored data then is convolved with an edge function <62> to enhance the contrast between any generally vertical (somewhat parallel to the column) line and the background. A preferred edge function is a 1×5 kernel such as −2, 1, 2, 1, −2. Where the array processor 22 operates on a 5×5 matrix, a 5×5 kernel is used as shown in FIG. 7. Functionally that is still a one dimensional function and is convolved with the data row by row. Next the data is smoothed by averaging five lines at a time <64>. This is also preferably accomplished by a convolution with a 5×5 kernel as shown in FIG. 8. The data in each column for 5 contiguous rows is multiplied by 0.2 and added to create a new row of data, and the process is repeated, advancing through the data array one row at a time.

Following the averaging operation, a noise removal operation is performed. This involves a two dimensional fast Fourier transform of the array <66> to transform the data into frequency domain for filtering by a low pass filter <68>. The filtering is done by a low pass filter which attenuates the high frequencies in the frequency domain to remove or reduce that noise which is associated with high frequency. A suitable filter has been found to be a ninth order Butterworth filter having a center frequency of 0 cycles per millimeter and a 3 dB frequency of 1.5 cycles per millimeter. Then an inverse fast Fourier transform of the filtered data is performed <70> to restore the data to space domain. This process results in the enhanced sinogram which is stored and displayed <72>. If the slice is not the last one to be scanned <74>, the process returns to the translation step, block 52, to collect data for the next slice. Otherwise, the process begins on another part.

The result of the array processing is to enhance the raw data an image of which is illustrated in FIG. 3. An image of the enhanced data is shown in FIG. 4 which contains visible detail which is useful in determining the nature of the cross section being inspected, although it is not a picture of the cross section. The flaws 34-40 (FIG. 2) are represented by lines 34'-40' which are vertical or slightly inclined. First of all, the presence of a line reveals the presence of a flaw in that cross section. In some cases, that is the only information required. However, much more information is revealed by the image of the enhanced sinogram. The width of each line is generally proportional to the size of the flaw. The inclination of some lines results from the view of each detector being angularly different from the views of other detectors. When a flaw is in the mid plane of the part, e.g. flaw 36, the corresponding line 36' is vertical. When the flaw is on the side of the mid plane nearer the detector, e.g. flaw 34, the corresponding line 34' is tilted in one direction and if on the other side of the mid plane, it is tilted in the other direction. The degree of tilt is dependent on the distance of the flaw from the mid plane. Flaws near one edge of the part are correspondingly near one edge of the sinogram, and so forth. Thus, a large amount of information about each cross section of the part is provided by the enhanced sinogram, yet a relatively short data acquisition time and a short computational time are required to generate the enhanced sinogram. In comparison, computed tomography using the same data acquisition system takes twelve times as long to produce a tomogram.

The sinogram enhancement process is not limited to the second generation tomography data acquisition system described above. The same enhancement process applies to sinograms acquired by other systems. For example, a third generation tomography system, as shown in FIG. 9, has a part 80 which is always in the irradiation zone 82 defined by the x-ray source 84 and a detector array 86. Instead of translating through the zone, the part 80 rotates in the zone 82 or the source 84 and detector array 86 rotate around the part. As the part rotates, many data samples are read. The data mapping is simple since all detectors are sampled at each angular position of the part and the data for each position goes into the same column of the data array. When data is collected for tomography the part is rotated for 180 or 360 degrees. However for enhanced sinography, only 20 degree rotation is needed (if the detector array arc is 20 degrees), thus dramatically reducing data acquisition time. The data array is processed in exactly the same manner as prescribed for the second generation device. The results are also the same except that the lines corresponding to flaws are sinuous curves rather than straight lines.

While the method and apparatus were developed for use in inspecting industrial parts it is evident that it is not limited to that application and may be used to examine other objects such as biological specimens. In the case of living organisms it has the advantage of dramatically reducing the radiation exposure.

The embodiments of the invention in which an exclusive property or privilege is claimed are defined as follows:

1. A method for displaying an image of an enhanced sinogram corresponding to an internal area of a body, comprising the steps of:
    relatively moving the body with respect to an irradiation zone formed by a source of radiation and an array of detectors such that a beam of radiation from the radiation source passes through a cross section of the body to the array of detectors;
    deriving from the array of detectors, at a series of successive positions of the body in the irradiation zone, a series of data representing received radiation intensity;
    mapping the series of data onto a two dimensional array representing a raw sinogram of radiation transmission characteristics of the body at the series of successive positions;
    convoluting the two dimensional array with a 1×5 kernel to enhance discontinuities within the body;
    smoothing the convoluted two dimensional array by averaging groups of contiguous lines in the array;
    transforming the smoothed array into a frequency domain through a two dimensional Fourier transform procedure;
    filtering the transformed array through a low pass filter;
    transforming the filtered array into a space domain through an inverse Fourier transform procedure, the transformed, filtered array representing an enhanced sinogram; and
    displaying an image of the enhanced sinogram.

2. A system for generating an image of a filtered array corresponding to an internal area of a body to reveal discontinuities in the body, comprising:
    a radiation source;
    an array of detectors spaced from the source for receiving radiation from the source and producing an output signal representing the radiation received by the array of detectors;
    means effecting relative movement between the body and the radiation source and the array of detectors whereby the output signal produced from the array of detectors is modulated according to radiation absorption characteristics of the body and relative body position;
    means for generating a raw sinogram from the output signal produced at a plurality of different relative positions of the body by mapping each produced signal into a two dimensional array;
    means for enhancing the raw sinogram, including (a) means for convoluting the array with an edge defining function to enhance discontinuities in the raw sinogram, (b) means for averaging groups of contiguous rows in the convoluted array to smooth the array, (c) a fast Fourier transform procedure for transforming the smoothed array to a frequency domain, (d) filtering means for filtering the transformed array in the frequency domain to attenuate high frequencies in the transformed array, and (e) an inverse fast Fourier transform procedure for transforming the filtered array to a space domain; and
    display means for displaying the filtered array in the space domain.

3. A system for generating an image of an enhanced sinogram corresponding to an internal area of a body to reveal discontinuities in the body, comprising: a radiation source;
    an array of detectors spaced from the source for receiving radiation from the radiation source and producing an output signal representing the radiation received;
    means for translating the body through a space between the radiation source and the array of detectors whereby the output signal is modulated according to radiation absorption characteristics of the body and according to body position relative to the radiation source and to the array of detectors;
    means for generating a raw sinogram from the output signal at a plurality of translational positions of the body relative to the radiation source and to the array of detectors, by mapping the signal into a two dimensional array;
    means for convoluting the raw sinogram to enhance discontinuities therein;
    means for averaging groups of contiguous rows in the convoluted raw sinogram;
    a fast Fourier transform procedure for transforming the averaged groups to a frequency domain;
    low pass filter means for removing high frequencies from the transformed groups;
    an inverse fast Fourier transform procedure for transforming the filtered groups back to a space domain, whereby the filtered groups comprise an enhanced sinogram revealing discontinuities in the absorption characteristics of the body; and
    display means for displaying an image of the enhanced sinogram.

* * * * *